United States Patent [19]
Shen et al.

[11] 3,880,818

[45] Apr. 29, 1975

[54] PHYSIOLOGICALLY COMPATIBLE PLASTIC CONTACT LENSES AND A METHOD FOR THEIR PRODUCTION

[76] Inventors: Mitchel Shen, 615 Parkside Ct., Kensington, Calif. 94707; Robert B. Mandell, 69 Sullivan Dr., Moraga, Calif. 94556; Lawrence Stark, 3081 Buena Vista Way, Berkeley, Calif. 94708

[22] Filed: Sept. 28, 1973

[21] Appl. No.: 401,668

Related U.S. Application Data

[63] Continuation-in-part of Ser. No. 215,137, Jan. 3, 1972, abandoned.

[52] U.S. Cl..... 260/80.75; 260/78.5 UA; 260/80.76; 204/159.23; 351/160
[51] Int. Cl. ............................................. C08f 15/40
[58] Field of Search...... 260/78.5 UA, 80.76, 80.75, 260/80.8, 80.81

[56] References Cited
UNITED STATES PATENTS

| | | | |
|---|---|---|---|
| 2,284,639 | 6/1942 | Coes | 260/84 |
| 2,492,169 | 12/1949 | Mast et al. | 260/79.5 |
| 2,983,696 | 5/1961 | Tocker | 260/23 |
| 3,503,942 | 10/1965 | Seiderman | 260/80.75 |
| 3,563,937 | 2/1971 | Nickerson | 260/33.4 |
| 3,575,946 | 4/1971 | Chromacek et al. | 260/86.1 |
| 3,607,848 | 9/1971 | Chromacek et al. | 260/86.1 |
| 3,676,410 | 7/1972 | Bauer et al. | 260/80.81 |
| 3,699,089 | 10/1972 | Wichterle | 260/86.1 |
| 3,728,315 | 4/1973 | Gustafson | 260/80.75 |
| 3,728,317 | 4/1973 | Blank | 260/86 JR |

*Primary Examiner*—Stanford M. Levin
*Attorney, Agent, or Firm*—Warren, Rubin & Chickering

[57] ABSTRACT

There is disclosed a soft contact lens made by forming a lens of a hard acrylic acid-type polymer and then softening the formed lens by esterifying pendant carboxyl groups with alkyl groups, hydroxyalkyl groups or alkoxyalkyl groups which contain no more than eleven carbon atoms.

3 Claims, No Drawings

PHYSIOLOGICALLY COMPATIBLE PLASTIC CONTACT LENSES AND A METHOD FOR THEIR PRODUCTION

CROSS REFERENCE

This application is a continuation-in-part of copending application Ser. No. 215,137, filed Jan. 3, 1972, for Physiologically Compatible Plastic Contact Lenses and a Method for Their Production, now abandoned.

BACKGROUND OF THE INVENTION

1. Field of the Invention

This invention relates to a novel contact lens and to a unique method for the production of the lens. More particularly, it relates to a method for the production of a flexible and physiologically compatible contact lens and to a method for the production of the lens from an acrylic-type polymer containing pendant carboxyl groups.

2. Prior Art

It is known in the art to fabricate contact lenses from rigid materials such as glass and from clear plastics such as acrylic polymers and the like. A serious disadvantage inherent in these materials has been the eye discomfort experienced by the wearer due in large part to the hardness of the lenses. One proposed solution to the problem has been the development of hydrogel-type acrylic polymers having a high degree of hydrophilicity. While contact lenses fabricated from hydrogel polymers are indeed soft and in general are accommodated by the human eye with relatively little discomfort, they too suffer from serious disadvantages including:

1. the hydrogel polymers accumulate harmful compounds;
2. the hydrogel-compound aggregates may favor growth of pathological organisms; and
3. the hydrogel lenses require special and inconvenient handling because of their poor structural strengths and high water contents.

Accordingly, there is a need for a composition suitable for use in the fabrication of substantially water-free, yet flexible, contact lenses which are comfortable for the wearer, strong, and convenient and safe to use.

THE INVENTION

A unique method for the preparation of new and improved contact lenses has now been found. In the method a hard, inflexible prepolymer is cut and polished to form a lens of a desired configuration. The shaped lens is then treated to convert the hard plastic into a flexible, physiologically compatible composition. In the treatment, the prepolymer is reacted with a suitable alcohol under esterification conditions.

The prepolymer is a three-dimensional acrylic-type polymer which contains pendant carboxyl groups. It is prepared by polymerizing one or more acrylic-type carboxylic acid monomers or preferably a mixture of one or more of the acrylic-type acid monomers which contains an acrylic-type ester monomer component. The mixture should contain at least about twenty mole percent of the acid component. It must also contain a minor amount of an organic divinyl cross-linking agent. The latter provides the prepolymer with the necessary dimensional characteristics.

EMBODIMENT

In a preferred embodiment, a prepolymer is prepared by polymerizing a mixture of acrylic acid, 2-methoxyethyl methacrylate, and 1,4-butanediol dimethacrylate. For each 100 moles of the mixture, there is desirably present 49.5 moles of acrylic acid, 49.5 moles of 2-methoxyethyl methacrylate and 1 mole of the 1,4-butanediol ester. The polymerization is effected by means of broad-band ultraviolet irradiation and is promoted by the addition to the mixture of about 0.1 weight percent (based upon the mixture) of benzoin, a photoinitiator. For the polymerization, the mixture is placed in a shallow vessel, preferably one having treated interior surfaces for easy removal of an acrylic polymer. The vessel is filled to a depth of about one-fourth inch with the polymerization mixture. At room temperature and using the ultraviolet irradiation to catalyze the polymerization, the reaction is completed in about 12 hours. The product, a prepolymer, is a hard, clear, inflexible acrylic type backbone polymer which contains pendant carboxyl and 2-methoxyethyl groups.

In the next stage, the prepolymer is cut into a lens blank (button). The blank is shaped into a contact lens taking into account a dimensional change (preliminary measurements would indicate about a 20 percent increase) which takes place in the subsequent esterification treatment. In these operations ordinary plastic lens production techniques, as known in the art [see, for example, "Contact Lens Practice," Robert Mandell; C. Thomas; Springfield, Illinois (1965)], are used for machining, grinding, and polishing of the contact lens precursors.

Next the hard, inflexible intermediate lens is converted to the desired physiologically compatible contact lens by an esterification treatment. The lens is immersed in acidified n-propanol which is maintained at the reflux temperature for about 10 hours, i.e. a period sufficient to esterify substantially all of the available free carboxyl groups. About a one weight percent (based upon the alcohol) portion of 85 percent sulfuric acid is a satisfactory amount of acid.

The treated lens is then removed from the n-propanol. It is extracted to remove low molecular weight substances and dried in a vacuum oven maintained at 60°C. The resulting lens is ready for use.

The treatment of the prepolymer appears in the main to involve the esterification of pendant carboxyl groups. However, it must be recognized that other reactions, including transesterification, etherification and interaction of pendant carboxyl and pendant 2-methoxyethyl groups of the prepolymer (internal transesterification), may also be taking place in some degree.

By an acrylic-type carboxylic acid monomer as used herein is meant by definition an acid of the formula $$R^1R^2C=CR^3CO_2H$$

in which the groups $R^1$, $R^2$ and $R^3$ are lower (carbon atom content of less than six) hydrocarbon radicals or hydrogen, preferably in which $R^1$ and $R^2$ are the same or different and are of the group hydrogen, methyl, and ethyl and in which $R^3$ is hydrogen or methyl.

Representative acrylic-type acids useful in the method herein include acrylic acid, methacrylic acid, 1-butenoic acid, isopentene-2-oic acid, 2,3-dimethylbutene-2-oic acid, 2-methylpentene-2-oic acid, and the like unsaturated acids. Acrylic acid is preferred.

By an acrylic-type ester monomer as used herein is meant by definition an ester of the formula $$R^1R^2C=CR^3CO_2Z$$

in which the groups $R^1$, $R^2$, and $R^3$ are as defined above, and in which Z is an alkyl group having a carbon atom content in the range from 1 to about 11, a hydroxyalkyl group having a carbon atom content in the range from 2 to about 11, or an alkoxyalkyl group having a carbon atom content in the range from 3 to about 11.

Representative acrylic-type ester monomers useful in the practice of the invention include methyl, ethyl, n-propyl, i-propyl, and the butyl acrylates and methacrylates; 2-hydroxyethyl acrylate and methacrylate, 2-hydroxypropyl acrylate and methacrylate, and especially the alkoxyalkyl acrylate and methacrylate esters where Z is of the formula $-CH_2CH_2OY$, $-CH_2CH(OY)CH_3$, $-CH_2CH_2CH_2OY$, $-CH(CH_3)CH_2OY$, or $-CH_2CH_2CH_2CH_2OY$ in which Y is an alkyl group having a carbon atom content in the range from 1 to about 7, and more particularly where Y has a carbon atom content in the range 1 to 3.

CROSS-LINKING AGENT

The polymerization mixture must contain some cross-linking agent. Otherwise the prepolymer and the treated prepolymer will not have a satisfactory dimensional stability. On the other hand, if it contains too much of the agent, the resulting polymer cannot be converted to a flexible and physiologically compatible composition by the method of the invention. For each 100 moles of the polymerizable components of the polymerization mixture, at least about 0.1 mole of a divinyl cross-linking agent is required. Usually a satisfactory prepolymer is obtained when the relative amount of the agent is in the range from 0.1 to 3, preferably 1 to 2, moles per 100 moles of the mixture.

Organic divinyl cross-linking agents in general as known in the olefin polymerization art are satisfactory for use in the method of the invention and are contemplated for use herein. The general formula for those agents of particular usefulness is $(H_2C=CH)_2Q$, where Q may be oxygen, or a divalent organic radical composed of carbon and hydrogen, or of carbon, hydrogen, and oxygen. In general, satisfactory linking agents have a molecular weight in the range from 70 to 400 units.

Representative cross-linking agents useful in the practice of the invention include compounds of the classes:

1. Divinyl esters of organic dicarboxylic acids such as oxalic, terephthalic, hexahydroterephthalic, malonic, succinic, and the like acids;

2. Divinyl-type ethers such as divinyl ether, allyl ether, dibut-3-enyl ether, dipent-4-enyl ether, and the like ethers;

3. Divinyl hydrocarbons (alpha-omega diolefinic hydrocarbons) such as divinyl benzene, divinyl toluene, 1,4-pentadiene, 1,5-hexadiene, and the like hydrocarbons containing two vinyl, i.e., $(CH_2=CH)-$, groups.

4. Aliphatic diol (glycol-type) esters of the acrylic-type acids of the group of acids formulated above, such as esters of the formula $CH_2=CH_2CO_2(CH_2CH_2O)_nCH_2CH_2O_2CCH=CH_2$ where n is a number in the range 0 to 3, inclusive;

1,4-cyclohexanediol diacrylate and dimethacrylate, and corresponding esters of 1,3-propanediol, 1,2-propanediol, 1,4-butanediol, ethylene glycol, and the like esters of acrylic-type carboxylic acids. The glycol-type acrylate and methacrylate ester cross-linking agents are preferred.

THE PREPOLYMER

Moderately cross-linked acrylic-type polymers are in general satisfactory for use in the preparation of the novel lenses of the invention provided, of course, that they contain sufficient pendant carboxyl groups. These groups in large measure are responsible for the nature of the prepolymer which makes it possible to carry out the mechanical operations needed for the shaping of the lens. Also, the carboxyl groups provide the functionality, the means, by which the shaped lens is ultimately converted into a softened, physiologically compatible composition.

The dimensional and carboxyl requirements of the prepolymer are conveniently satisfied by determination of the relative proportions and kinds of the reactants employed for the polymerization reaction. The relationship between the dimensional stability factor and the amount of the cross-linking agent used has been considered above. Regarding the other reactants, the acrylic-type monomers, all may be carboxylic acid, a mixture of these acids, or one or more of these acids plus one or more of the acrylic-type ester monomers. Preferably the prepolymer is prepared from a mixture of the acid and ester monomers and in which the prepolymer, an acrylic-type polymer, contains the following components based upon 100 moles of the polymerization reaction mixture:

1. an amount of an acrylic-type acid in the range from 20 to 89.9 moles; more preferably 50 to 74.9 moles;

2. an amount of an acrylic-type ester in the range from 10 to 74.9 moles, more preferably 25 to 49.9 moles; and 3. an amount of a divinyl cross-linking agent in the range from about 0.1 to 3 moles, more preferably 1 to 2 moles.

Where the acid component of the prepolymer is acrylic, methacrylic, or a mixture of these acids and the ester component is an alkoxyalkyl acrylate or methacrylate the method herein usually results in the preparation of superior contact lenses. When the ester component is hydroxyalkyl or a mixture of hydroxyalkyl and alkoxyalkyl, not more than 45 mole percent of hydroxyalkyl ester should be used to prevent the resultant lens from being too hydrophilic.

The polymerization of mixtures of acrylic-type monomers is well known in the art and is not of itself a part of the invention. The ordinary conditions as known in the art (see "Organic Chemistry of Synthetic High Polymers," R. W. Lenz, Interscience Publishers, N.Y. [1967]) for the polymerization of acrylic acid and acrylate esters are satisfactory for use with the above-described reaction mixtures. Representative polymerization conditions include: (1) the use of a suitable catalyst (an organic or inorganic peroxide or actinic light, or x-rays, or electron bombardment and the like); (2) the use of heat and sufficient pressure to maintain the reactants in the liquid phase; and (3) the use of sufficient reaction time to provide for a substantially complete polymerization of the mix. A preferred method for use herein is the ultraviolet catalyzed polymerization carried out at the ambient temperature.

TREATMENT OF THE PREPOLYMER

The conversion of the hard, inflexible prepolymer to a softened material which is physiologically compatible is believed to result from the esterification of most if not all of the pendant carboxyl groups of the prepolymer. The esterification takes place although the prepolymer has very little or no solubility in any alcohol, or mixture of alcohols, suitable for use in the method of the invention. Apparently, the three-dimensional structure of moderately cross-linked acrylic-type polymers facilitates a reasonably effective mass transfer of alcohol into the polymer by swelling. A wide range of hydroxyl-bearing organic compounds and esterification conditions are suitable for the conversion.

ESTERIFICATION ALCOHOL

Alcohols in general are useful for the treatment herein provided that the molecular dimensions of the alcohol permits a reasonable degree of penetration into the interior of the prepolymers described above. Thus, usually the carbon atom content of the alcohol will be less than about 11, although alcohols having somewhat larger carbon atom contents, for example, possibly as much as 15, may exhibit some beneficial effect upon the prepolymer. The alcohol may be a monatomic, diatomic, or methoxy-, ethoxy- or propoxy monatomic alcohol. A single alcohol or a mixture of alcohols may be used for the esterification.

More satisfactory results usually are experienced when the treated prepolymer, i.e., the final product, contains less than about 75 mole percent of alkoxyalkyl and hydroxyalkyl ester groups. The sum of the hydroxyalkyl and alkoxyalkyl ester groups for the treated prepolymer should be in the range of 10 to 75, preferably from 25 to 50 mole percent, of the total of the ester groups. Hydroxyalkyl ester groups should not exceed 45 mole percent to prevent the final formed lens from being too hydrophilic.

The alcohols used for the esterification treatment may contain primary, secondary, or tertiary hydroxyl groups. Best results, in general, appear to be obtained from the use of monatomic primary alcohols having a carbon atom content in the range from 1 to about 4.

A preferred class of alcohols contemplated for use in the invention may be represented by the formula QOH in which Q is:

1. A hydrocarbon radical having a carbon atom content in the range from 1 to 11; or
2. A radical of the formula $-CH_2CH_2OY$, $-CH_2CH(OY)CH_3$, $-CH_2CH_2CH_2OY$, $-CH(CH_3)CH_2OY$, $-CH_2CH_2CH_2CH_2OY$, or the like in which Y is an alkyl group having a carbon atom content in the range from 1 to about 7, more preferably 1 to 3. The aforementioned hydrocarbon radicals should be free of olefinic and acetylenic carbon-carbon unsaturation. Depending upon the carbon atom content, these hydrocarbon radicals may be alkyl, cycloalkyl, aralkyl, alkylcycloaklyl or cycloalkylalkyl groups and the alkyl portions may be of the straight or branched chain moiety. Preferably the hydrocarbon radical is an alkyl group.

Representative alcohols (esterification agents) useful in the practice of the invention include methanol, ethanol, n-propanol, i-propanol, n-butanol, s-butanol, t-butanol, pentanol-2, n-pentanol, n-hexanol, heptanol-2, octanol, nonanol, decanol, and the like alkanols, especially those alkanols having a carbon atom content below 8; also included are cyclohexanol, benzyl alcohol, hexahydrobenzyl alcohol, 1,4-cyclohexanediol, cyclopentanol, 2-methylcyclopentanol and the like cyclic alcohols; 2-methoxyethanol, 2-methoxypropanol-1, 2-ethoxyethanol, 2-(n-propoxy)-ethanol, 3-(n-propoxy)-n-propanol, 3-methoxy-n-butanol, 4-(n-propoxy)-n-butanol, 4-ethoxy-n-butanol and the like alkoxy alkanols; glycol, 1,4-butanediol, 1,3-propanediol, 1,2-dihydroxybutane, 1,3-dihydroxybutane, and the like diatomic alcohols. n-Propanol is a preferred alcohol esterification agent.

ESTERIFICATION CONDITIONS

A wide range of temperatures are suitable for carrying out the present treatment with an esterification agent. In general, a satisfactory temperature will be in the range from about 50°C to 300°C. Since the agent must be in the liquid phase, a pressure sufficient to maintain the liquid phase is required when the temperature used is in the upper range of the useful temperatures.

In general, the time required for a satisfactory conversion of the prepolymer depends upon the temperature employed, upon the particular alcohol agent used, and upon the presence or absence of an esterification catalyst in the mix. Usually the time required will be in the range from about 1 to 100 hours, with the shorter times corresponding to the use of an upper temperature of the range.

The esterification proceeds in the absence of a catalyst under the ordinary thermal esterification conditions as known in the art, for example, at a temperature above about 120°C and below about 300°C. Preferably, an esterification catalyst which is soluble in the alcohol agent is employed. In general, esterification catalysts as known in the art for their usefulness in the catalysis of alkanolcarboxylic acid esterifications are also useful in the present method. Because of its general solubility in the agents contemplated herein and because of the relative ease of its removal from the treated prepolymer, concentrated sulfuric acid is a preferred catalyst. Usually a reaction time in the range 4 to 20 hours is satisfactory when sulfuric acid is used to catalyze the desired conversion.

The amount of the agent and catalyst desirably used varies widely. In general, sufficient of the alcohol agent for complete immersion of the prepolymer should be used. Based upon the weight of the alcohol agent used, pursuant to ordinary esterification practice, an effective amount of the esterification catalyst is in the range from about 0.2 to 5 weight percent.

The following representative examples further illustrate the invention. In each case the polymerization mixture was maintained at a temperature of about 25°C. The reaction was catalyzed by irradiation of the mixture with broadband ultraviolet light until the reaction was essentially completed, i.e., in the range from 4 to 12 hours. About 0.1 weight percent of benzoin was included in the mixture in order to improve the efficiency of the catalyst. The cross-linking agent was 1,4-butanediol dimethacrylate which was added to the polymerization mixture in the ratio of 1 mole per 99 moles of the acrylic-type monomer(s) employed. The resulting acrylic-type prepolymers were, in general, hard and inflexible solids.

Using standard lens fabrication methods, a lens blank was cut and a lens shaped from a portion of the product from each example. The shaped lens was then immersed in a suitable alcohol as noted in the Table below together with about 0.5 grams of sulfuric acid per 100 grams of the alcohol. The acidified alcohol and lens was then maintained at the temperature and for the period also as noted in the Table. In examples 1–8 acrylic acid (AA) or acrylic acid and 2-methoxyethyl methacrylate (MEMA) were used. After the treated lens was removed from the alcohol, it was washed and oven dried at 60°C with the following comparative results.

TABLE

| EXAMPLE NO. | ACRYLIC-TYPE COMPONENTS | RELATIVE AMOUNT, MOLES | ALCOHOL | ESTERIFICATION CONDITIONS TEMP. °C. | TIME, HRS. | REMARKS |
|---|---|---|---|---|---|---|
| 1. | AA | 1.0 | N-Propanol | 90 | 6 | Soft Lens, Fair |
|  | MEMA | 0.0 |  |  |  |  |
| 2. | AA | 0.75 | N-Propanol | 90 | 6 | Soft Lens, Good |
|  | MEMA | 0.25 |  |  |  |  |
| 3. | AA | 0.50 | N-Propanol | 90 | 6 | Soft Lens, Fair |
|  | MEMA | 0.50 |  |  |  |  |
| 4. | AA | 0.25 | N-Propanol | 90 | 6 | Soft Lens, Fair |
|  | MEMA | 0.75 |  |  |  |  |
| 5. | AA | 1.0 | Methoxyethanol | 125 | 4 | Soft Lens, Good |
|  | MEMA | 0.0 |  |  |  |  |
| 6. | AA | 0.75 | Methoxyethanol | 125 | 4 | Soft Lens, Excellent |
|  | MEMA | 0.25 |  |  |  |  |
| 7. | AA | 0.50 | Methoxyethanol | 125 | 4 | Soft Lens, Excellent |
|  | MEMA | 0.50 |  |  |  |  |
| 8. | AA | 0.25 | Methoxyethanol | 125 | 4 | Soft Lens, Fair |
|  | MEMA | 0.75 |  |  |  |  |

The above examples demonstrate that moderately cross-linked acrylic-type polymers containing pendant carboxyl groups are improved by treating them under esterification conditions with a lower alcohol.

In addition to the foregoing examples, contact lenses have been made by the method herein in the form of corneal, semi-scleral and scleral lenses of various types as known in the art. In every case, the lenses had excellent properties including good flexibility, good physiological compatibility, and but a minor water equilibration value.

Obviously, many modifications and variations of the present method for the production of physiologically compatible plastic materials and contact lenses are evident in view of the teachings given hereinabove including the addition of coloring materials as known in the art. It is therefore to be understood that, within the scope of the appended claims, the invention can be practiced otherwise than as specifically described.

We claim:

1. A physiologically compatible contact lens comprising a three-dimensional acrylic-type polymer consisting essentially of mixed ester monomers of the formula $$R^1R^2C=CR^3CO_2Z$$

wherein $R^1$ and $R^2$ are the same or different and are selected from hydrogen, methyl groups and ethyl groups; $R^3$ is selected from hydrogen and methyl groups; and Z is selected from alkyl groups having 1–11 carbon atoms, hydroxyalkyl groups having 1–11 carbon atoms, and alkoxyalkyl groups selected from $-CH_2CH_2OY$, $-CH_2CH(OY)CH_3$, $-CH_2CH_2CH_2OY$, $-CH_2(CH_3)CH_2OY$ and $-CH_2CH_2CH_2CH_2OY$ wherein Y is an alkyl group with from 1–7 carbon atoms, and mixtures thereof, with from 10–75 mole percent of the groups designated Z being selected from hydroxyalkyl and alkoxyalkyl groups but in no event do said hydroxyalkyl groups constitute more than 45 mole percent of said groups, and said polymer including from 0.1 to 3 moles of a divinyl compound cross-linking component having a molecular weight of from 70–400 per 100 moles of monomers.

2. The contact lens of claim 1 wherein Y has from 1–3 carbon atoms.

3. The contact lens of claim 1 wherein from 10 to 50 mole percent of the groups designated Z are alkoxyalkyl groups.

\* \* \* \* \*